(No Model.)

S. E. FISH & C. G. KING.
POKER, TONGS, AND STOVE LID LIFTER.

No. 331,954. Patented Dec. 8, 1885.

Attest:
John A. Ellis
A. B. Moore

Inventors:
Sidell E. Fish
Charles G. King
By David A. Burr
Atty.

UNITED STATES PATENT OFFICE.

SIDELL E. FISH AND CHARLES G. KING, OF GREENPORT, NEW YORK.

POKER, TONGS, AND STOVE-LID LIFTER.

SPECIFICATION forming part of Letters Patent No. 331,954, dated December 8, 1885.

Application filed June 1, 1885. Serial No. 167,266. (No model.)

*To all whom it may concern:*

Be it known that we, SIDELL E. FISH and CHARLES G. KING, both of Greenport, in the county of Suffolk and State of New York, have invented a new and useful Improvement in Combined Poker, Tongs, and Stove-Lid Lifter; and we do hereby declare that the following is a full and exact description thereof, reference being had to the accompanying drawings, and to the letters of reference marked thereon, making a part of this specification.

Our invention relates to a combined poker, stove-lid lifter, and tongs, adapted to perform effectively the functions of each of these implements, the object of the invention being to avoid the necessity of three separate devices by combining them advantageously in a single neat tool, in much better shape and at less cost than has heretofore been accomplished.

Figure 1:
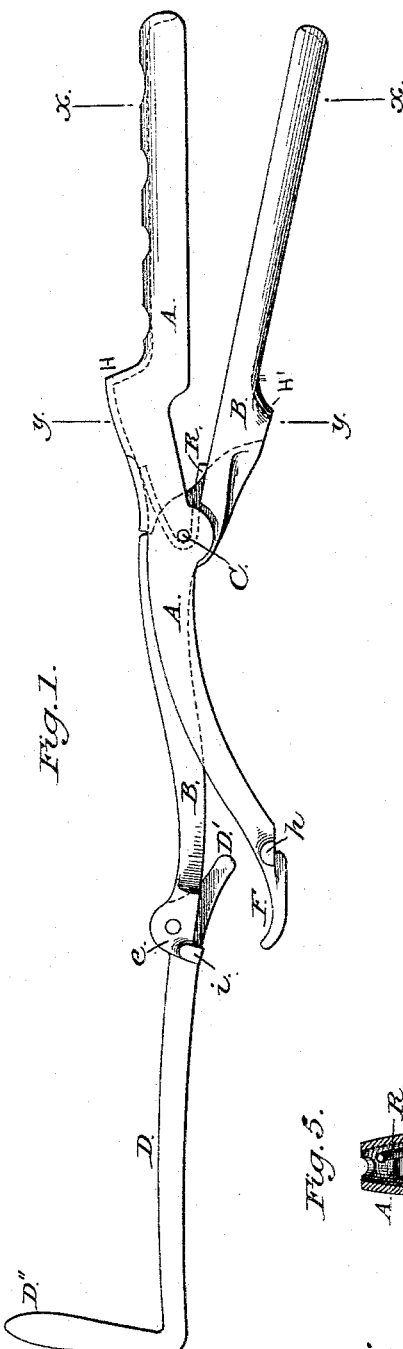
Figure 2:
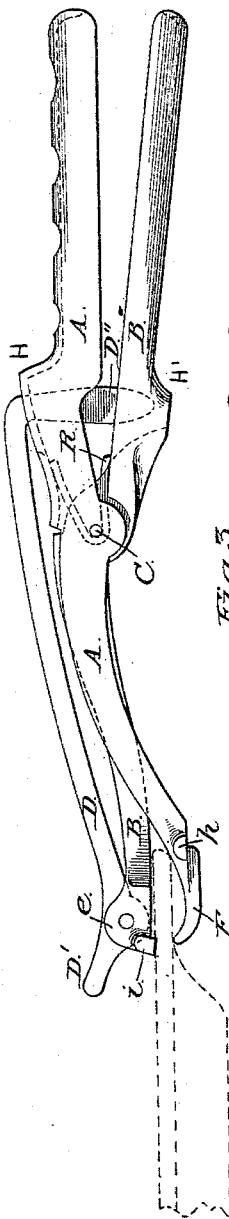
Figure 3:
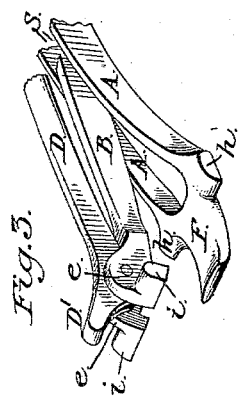
Figure 4:
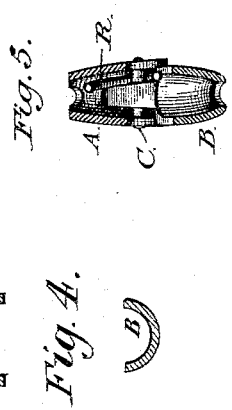

In the accompanying drawings, Figure 1 is a side elevation of our improved poker, tongs, and lid-lifter with the poker thrown out into its operative position. Fig. 2 is a similar view illustrating the poker folded and the tongs as in use for taking up a dish. Fig. 3 is a perspective view of the outer end of the device with the poker folded, as in Fig. 2, illustrating the form of the lid-lifter and outer end of the tongs. Fig. 4 is a cross-section in line $x\ x$, and Fig. 5 is a cross-section in line $y\ y$ of Fig. 1.

A represents a metallic arm, hollowed out upon its under side in cross-section at the end constituting its handle, (see Fig. 4,) and slotted longitudinally at its opposite end at S, (see Fig. 3,) to receive a second arm, B, which, extending through the slot at S, is pivoted at C between the two sides of the recess extending along the under side of the arm A. The handle end of this second arm, B, is curved or recessed longitudinally upon its inner side (see Fig. 4) in manner corresponding to that of the handle of the arm A, while its outer end, beyond its pivot C, consists of a flat bar and terminates in a fork, between whose jaws $e\ e$ (see Fig. 2) one end of a poker, D, is pivoted. The inner end, D', of the poker extends far enough beyond its pivot-pin to engage the under side of the arm B at the inner end of the jaws $e\ e$, so that when the poker is opened out it is stopped and supported in line with the arm B, to constitute, in effect, an extension thereof, in manner as illustrated in Fig. 1. When swung over upon its pivot and closed, the poker lies upon the upper side of the arm B, while its outer bent end, D'', extending beyond the pivotal point C of the two arms A and B, drops through an opening in the upper side of the arm A, as shown in Fig. 2, and projects into a recess or opening in the arm B. The end D'' is thus wholly inclosed and concealed when folded over. The outer slotted end of the arm A is provided with a head, F, which is fashioned to serve as a stove-lid lifter, being formed to enter the customary recess in a stove-lid, and is provided with lateral offsets $h\ h$, to furnish a wide bearing. The outer end of the arm B is provided with lateral lugs $i\ i$, which afford a wide bearing to facilitate its engagement with an object to be picked up.

The pivotal connection of the two arms causes the end F of the arm A to close tightly against the opposite end of the arm B when the handle ends of the two arms are closed together. The two pivotal arms are thus adapted to serve as tongs, their outer ends being kept automatically open by means of a spring, R. This spring may consist of a strip of elastic wire bent around the pivot-pin C, within the recess in which the arm A is hinged, and upon one side of said arm, as shown in Fig. 5, the two ends of the spring being made to bear the one against the arm A and the other against the arm B, as illustrated in Figs. 1, 2, and 5.

The handle ends of the arms A and B are formed with offsets H H', which serve the double purpose of providing a sheath for the outer bent end of the poker when it is folded in, as shown in Fig. 2, and a guard to protect the hand from contact with this end of the poker—a matter of importance after the poker end has become hot in use.

In the operation of the device, when it is desired to use the poker, the poker-rod D is readily thrown out into operative position by allowing the arms to open so as to permit the inner end, D', of the rod to pass the end F of the arm B, and then by dropping the hand with a slight jerk the rod will swing out into line. The contact of the end D' with the arm B will operate to stop and support the poker in line with the arm B, while by closing the end F of the arm A against said end D' the poker may be held perfectly rigid.

When the poker is not needed, it is readily folded back upon the arm A, entirely out of the way, as illustrated in Fig. 2, leaving the end F of the arm A free and unobstructed for use in lifting stove-lids, or, in connection with the end of the arm B, for use as a pair of tongs in lifting hot plates or pans or coals, or for other purposes.

We claim as our invention—

1. The combination, with the arm B and a folding poker, D, hinged thereto and provided with an extension or projection, D', at its inner end, of an arm, A, pivoted to the arm B, to close at its outer end against said extension D', substantially in the manner and for the purpose herein set forth.

2. The combination, with the arm B, fitted with a poker, D, hinged thereto to fold back thereon, and with the arm A, pivoted to said arm B, of offsets H H', formed to project outwardly from each arm between its pivot and handle, and slotted to receive and inclose the outer end of the folded poker, whereby the hand is protected from its heat, substantially in the manner and for the purpose herein set forth.

3. The combined tool, constructed, substantially as described, of the arm A, terminating at its outer end in a lid-lifter, F, the arm B, pivoted to the arm A, so that the outer ends of the two arms shall close together, and a poker-rod, D, provided with stop extension or projection D', and pivoted to the outer end of the arm B, to fold back on said arm, substantially in the manner and for the purpose herein set forth.

In testimony whereof we have signed our names to this specification in the presence of two subscribing witnesses.

SIDELL E. FISH.
CHAS. G. KING.

Witnesses:
BENJ. J. CLARK,
CARRIE M. REEVE.